United States Patent [19]

Akasawa

[11] Patent Number: 5,679,418
[45] Date of Patent: Oct. 21, 1997

[54] POLYURETHANE AND LEATHER-LIKE SHEET UTILIZING THE SAME

[75] Inventor: Toshiyuki Akasawa, Kurashiki, Japan

[73] Assignee: Kuraray Co., Ltd., Kurashiki, Japan

[21] Appl. No.: 551,806

[22] Filed: Nov. 7, 1995

[51] Int. Cl.$^6$ ............................... A01N 3/00; C08F 23/04
[52] U.S. Cl. .................... 428/15; 428/423.1; 428/245; 428/289; 428/290; 428/904; 428/91; 525/457; 525/458; 427/389; 8/515; 8/926
[58] Field of Search ........................ 525/457, 458; 428/423.1, 245, 289, 290, 15, 904, 91; 427/389; 8/519, 926

[56] References Cited

U.S. PATENT DOCUMENTS

| 3,861,937 | 1/1975 | Hanneken et al. | 117/10 |
|---|---|---|---|
| 4,562,239 | 12/1985 | Yamane et al. | 528/65 |
| 4,898,922 | 2/1990 | Shiraki | 528/60 |
| 5,159,051 | 10/1992 | Onwumere et al. | 528/67 |
| 5,234,525 | 8/1993 | Krishnan | 156/331.7 |

FOREIGN PATENT DOCUMENTS

| 2118001 | 7/1972 | France . |
|---|---|---|
| 41-11651 | 6/1966 | Japan . |
| 44-16386 | 7/1969 | Japan . |
| 47-19189 | 6/1972 | Japan . |
| 48-22602 | 3/1973 | Japan . |
| 48-55995 | 8/1973 | Japan . |
| 50-48061 | 4/1975 | Japan . |
| 50-17237 | 6/1975 | Japan . |
| 56-13832 | 2/1981 | Japan . |
| 58-45221 | 3/1983 | Japan . |
| 4-178416 | 6/1992 | Japan . |
| 4-178417 | 6/1992 | Japan . |
| 4-180922 | 6/1992 | Japan . |
| 5-9256 | 1/1993 | Japan . |
| 5-39338 | 2/1993 | Japan . |
| 5-59674 | 3/1993 | Japan . |

*Primary Examiner*—Paul J. Thibodeau
*Assistant Examiner*—Mary Critharis
*Attorney, Agent, or Firm*—Oblon, Spivak, McClelland, Maier & Neustadt, P.C.

[57] ABSTRACT

A polyurethane composition suitable for producing leather-like sheets having a soft hand and excellent durability and being dyeable with acid dyes comprising a mixture of:

a first polyurethane (a) obtained by reacting:

an intermediate product diol (D) with both ends thereof substantially being OH and obtained by reacting a tertiary amino group-containing diol (A), a polymer diol (B) having a number average molecular weight of 500 to 3,000 selected from the group consisting of polyesters, polycarbonates, polylactones and polyethers and an organic diisocyanate (C1), in such stoichiometric amounts as to make the molar ratio of NCO/OH 0.5 to 0.99, a low molecular weight diol (E), and diphenylmethane-4,4'-diisocyanate (C2), and a second polyurethane (b) having a solubility in toluene of not more than 50% by weight and obtained by reacting a polymer diol having structural units from dimethylsiloxane and a second organic diisocyanate and having a number average molecular weight of 1,000 to 10,000, the ratio of said second polyurethane (b) to said first polyurethane (a) being in a range of 0.5 to 50% by weight.

13 Claims, No Drawings

POLYURETHANE AND LEATHER-LIKE SHEET UTILIZING THE SAME

TECHNICAL FIELD

The present invention relates to a polyurethane having excellent dyeability and a leather-like sheet utilizing the polyurethane. More specifically, the present invention relates to a polyurethane having excellent mechanical properties, durability and like properties and good processability and being dyeable with acid dyes, and to a leather-like sheet utilizing the polyurethane and being dyeable with acid dyes.

BACKGROUND ART

Polyurethanes have excellent mechanical properties. Leather-like sheets utilizing polyurethane are used in various applications. These sheets are obtained either by permitting a fibrous base to be impregnated and/or applied with a polyurethane solution, followed by conducting dry or wet coagulation of the solution, or further applying a surface coating layer of a polyurethane skin layer to a fibrous base to which a polymer liquid has been applied and solidified. However, conventional polyurethane resins have no dyeable sites required for dyeing with acid dyes or cationic dyes and have therefore been undyeable with these dyes. Although the polyurethane resins are dyeable with disperse dyes, the dyes can hardly be retained in the resins due to looseness of the amorphous structure of polyurethanes, resulting in very poor color fastness. Thus, the polyurethanes once dyed with disperse dyes readily undergo color dropping off or fading away and have not been usable for practical purposes.

In order to improve the above drawback, introduction of dyeable sites into polyurethane resins has been attempted. It is known that use of a chain extender of a low molecular weight compound having a tertiary nitrogen atom or piperidine ring makes a polyurethane dyeable with acid dyes.

For example, Japanese Patent Application Laid-open No. 55995/1973 and Japanese Patent Publication No. 16386/1969 disclose that completion of reaction of unreacted isocyanate groups by using a monofunctional alcohol or amine having in the molecule thereof a tertiary or quaternary nitrogen atom realizes production of a dyeable polyurethane.

However, the monofunctional alcohol or amine used in the above process is introduced into the terminal of the polyurethane molecules. Then, use of a large amount of the alcohol or amine to increase the dyeability decreases the molecular weight of the resulting polyurethane, resulting in too low a viscosity of the polyurethane solution. As a result, the polyurethane has poor processability and mechanical properties. If the molecular weight of the polyurethane is increased up to a level achieving satisfactory mechanical properties and processability (solution viscosity), it will become impossible to introduce a monobasic alcohol or amine in an amount satisfactory for assuring sufficient dyeable seats. Accordingly, this process has been rather difficult to use on a commercial scale.

Japanese Patent Application Laid-open No. 22602/1973 discloses a process for producing a man-made leather which, allegedly, has excellent dyeability, lightfastness and functionality. According to the laid-open, the process uses a polyurethane synthesized from an N-substituted diethanolamine represented by the general formula

wherein R is an aliphatic alkyl group, an aromatic or aliphatic diisocyanate and a polyester glycol or polyether glycol having a molecular weight of 500 to 5,000 and at least 2 active hydrogen atoms in the molecule thereof.

However, this process uses as a chain extender an N-substituted diethanolamine, represented by the above general formula and thus having a branched molecular structure, which should exert a stearic hindrance effect to hinder formation of firm hard segments. As a result, the resulting polyurethane has not only poor mechanical properties but also poor resistance to heat, solvent and the like, thereby becoming completely unfit for application to man-made leathers.

In addition, if the above glycol having a molecular weight of 500 to 5,000, that is essential for constituting polyurethane, is a polyether glycol, the resulting polyurethane can be only poorly wet coagulatable, thereby hardly giving a man-made leather with good hand. If the above glycol is a polyester glycol, an N-substituted diethanolamine, used in a sufficient amount to achieve good dyeability, will deteriorate the polyester glycol. In this case, the N-substituted diethanolamine may be used in a small amount in order to suppress the deterioration, with the resulting dyeability being insufficient. Accordingly, this process has been hardly applicable on a commercial scale.

Japanese Patent Publication No. 19189/1972 discloses a process for producing polyurethanes having good dyeability, which comprises reacting a polymeric isocyanate compound having terminal isocyanate groups with a chain extender containing 5 to 50 mole % of a compound represented by the general formula

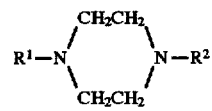

wherein $R^1$ and $R^2$ each represents a hydrogen, $-CH_2CH_2NH_2$ or $-CH_2CH_2CH_2NH_2$.

The publication states that this process is applicable to polyester- and polyether-based isocyanate compounds and that the obtained polyurethanes are dyeable with acid dyes, to say nothing of disperse dyes, thus showing its superiority.

However, the polyurethanes obtained by the process of the publication have as part of the chain extender used an N-substituted diethanolamine having ring structure and a diol.

Since such a chain extender exerts a stearic hindrance effect, thereby hindering formation of firm hard segments, the resulting polyurethanes have not only poor mechanical properties but also poor resistance to heat, solvent and the like, thereby becoming completely unfit for application to man-made leathers. In addition, if the glycol having a molecular weight of 500 to 5,000, that is essential for constituting polyurethane, is a polyether glycol, the resulting polyurethane can be only poorly wet coagulatable, thereby hardly giving a man-made leather with good hand. If the above glycol is a polyester glycol, an N-substituted compound, used in a sufficient amount to achieve good dyeability, will deteriorate the polyester glycol. In this case, the N-substituted compound may be used in a small amount in order to suppress the deterioration, with the resulting dyeability being insufficient. Accordingly, this process has been hardly applicable on a commercial scale.

Japanese Patent Publication No. 11651/1966 discloses an elastic filament comprising a polyurethane obtained by reacting a linear polyhydroxyl compound having terminal hydroxyl groups, an excess amount of a diisocyanate and a chain extender comprising a diamine, hydrazine, hydrazide or a mixture of the foregoing and containing units represented by the following formula:

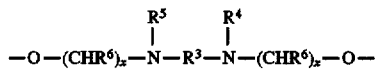

wherein $R^3$ means a linear or branched alkylene chain having 2 to 12 carbon atoms, $R^4$ means an alkyl group, $R^5$ means an alkyl group or an alkylene group formed in combination with $R^4$, $R^5$ means an alkyl group and X means an integer of 2 to 6. This polyurethane is not satisfactory either.

As an attempt to prevent deterioration in the properties of polyurethanes due to introduction of a tertiary amino group-containing compound, Japanese Patent Publication No. 17237/1975 discloses a process for producing dyeable polyurethane elastic bodies, which comprises, in producing a polyurethane elastic body from an organic polyisocyanate, a high molecular weight polyhydroxy compound and a multifunctional low molecular weight compound, conducting block copolymerization by adding a semi-polymer having terminal hydroxyl groups and obtained by reacting an organic diisocyanate, a diol having a tertiary nitrogen atom and at least 7 mole % of the diol of a high molecular weight polyhydroxy compound.

The publication states that the polyurethanes obtained by the process can be provided with good dyeability with no influence on the properties of the resulting elastic filament and asserts the superiority of the polyurethanes.

However, the process according to the publication requires a too complex preparation steps, since a diol having a tertiary nitrogen atom is, via a semi-polymer having terminal hydroxyl groups and obtained by reacting therewith a high molecular weight polyhydroxy compound, subjected to formation reaction of polyurethane. This complexity of the process requires a large amount of work to control, which obstructs commercial utilization of the process. In addition, the obtained polyurethanes have a large variation in quality, and leather-like sheets obtained therefrom sometimes have stiff hand and lack surface smoothness, thus being commercially unsatisfactory.

Japanese Patent Application Laid-open Nos. 178416/1992 and 178417/1992 disclose a process for producing polyurethane resins, which comprises reacting a macromonomer (A) obtained by subjecting a monomer having a radical polymerizable unsaturated bond to radical polymerization in the presence of a mercaptan-based chain transfer agent having at least 2 hydroxyl groups and one mercapto group, a polyol (B) and a polyisocyanate (C); and a polyurethane resin composition comprising the obtained polyurethane resin. These laid-opens mention, as examples of the mercaptan-based chain transfer agent having at least 2 hydroxyl groups and one mercapto group and monomer having a radical polymerizable unsaturated bond, 3-mercapto-1,2-propanediol and (meth) acrylates containing a tertiary amino group such as dimethylaminomethyl(ethyl) (meth)acrylate, respectively. The laid-open applications allege the superiority of the obtained polyurethane while showing that it has good adhesiveness to steel plate.

However, the polyurethane resins obtained by the process of the laid-open applications with which the viscosity does not sufficiently elevate upon polymerization and the properties such as resistance to heat and cold and strength are not sufficiently balanced with each other, have been unapplicable to preparation of man-made leather-like sheets, being usable as adhesives though. This is considered to be perhaps due to that the reaction is conducted while not following a specified sequence, or that components in the resin do not have controlled sequence structure.

SUMMARY OF THE INVENTION

Accordingly, an object of the present invention is to provide a leather-like sheet having a soft hand and excellent durability and being dyeable with acid dyes, the sheet utilizing a polyurethane resin which is provided with improved dyeability by introduction of dyeable sites for acid dyes and usable on a commercial scale.

The present invention provides a polyurethane composition comprising:

a first polyurethane (a) obtained by reacting:

an intermediate product diol (D) with both ends thereof substantially being OH and obtained by reacting a tertiary amino group-containing diol (A), a polymer diol (B) having a number average molecular weight of 500 to 3,000 selected from the group consisting of polyesters, polycarbonates, polylactones and polyethers and an organic diisocyanate (C1), in such stoichiometric amounts as to make the molar ratio of NCO/OH 0.5 to 0.99, a low molecular weight diol (E), diphenylmethane-4,4'-diisocyanate (C2), and a second polyurethane (b) having a solubility in toluene of not more than 50% by weight and obtained by reacting a polymer diol having structural units from dimethylsiloxane and a second organic diisocyanate (C3) and having a number average molecular weight of 1,000 to 10,000, the ratio of said second polyurethane (b) to said first polyurethane (a) being in a range of 0.5 to 50% by weight.

The present invention further provides a leather-like sheet comprising the above polyurethane and a fibrous base.

DETAILED DESCRIPTION AND BEST MODE FOR CARRYING OUT THE INVENTION

In the present invention, in order to improve the dyeability of polyurethane, a tertiary amino group-containing diol (A), which will play the role of dyeable site, is introduced, not into the hard segments (chain extender) or the molecular terminals of the polyurethane, but into an intermediate product diol (D) that forms the soft segments. As a result, it becomes possible to introduce a required amount of dyeable sites without adversely affecting the molecular weight or crystallinity of hard segments of the resulting polyurethane. Accordingly, there is no particular limitation to the amount incorporated of the tertiary amino group-containing diol (A). The incorporation amount also varies depending on the molecular structure, the desired dyeability, dyes to be used and like factors, but it is desirably in an amount of tertiary amino group of 1 to 1,000 μ eq/g based on the polyurethane, more preferably 1.5 to 500 μeq/g and most preferably 2 to 200 μeq/g on the same basis.

Examples of the tertiary amino group-containing diol (A) are as follows.

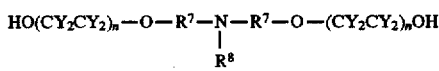

wherein Y is H or a lower alkyl group having 1 to 6 carbon atoms, $R^7$, which may be the same or different, is a lower alkylene group having 2 to 6 carbon atoms, $R^8$ is a lower alkyl group having 1 to 6 carbon atoms or a phenyl group and n is an integer of 1 to 10,

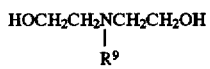

wherein $R^6$ is an aliphatic alkyl group or phenyl group,

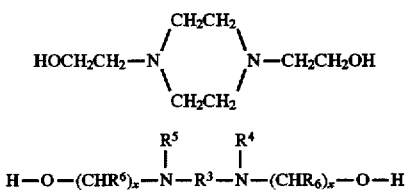

wherein $R^3$ is a linear or branched alkylene chain having 2 to 12 carbon atoms, $R^4$ is an alkyl group, $R^5$ is an alkyl group or an alkylene group formed in combination with $R^4$, $R^6$ is an alkyl group and X is an integer of 2 to 6.

Further in the present invention, there can be used as the tertiary amino group-containing diol (A) one obtained by subjecting a tertiary amino group-containing acrylic acid and/or methacrylic acid alkyl ester to radical polymerization in the presence of a compound having 2 hydroxyl groups and one thiol group.

This type tertiary amino group-containing diols are obtained by any one of known processes. For instance, a tertiary amino group-containing acrylic acid and/or methacrylic acid alkyl ester monomer, such as diisopropylaminoethyl methacrylate, t-butylmethylaminoethyl methacrylate, 2(di-n-propylamino)-1-methylethyl methacrylate, dimethylaminoethyl methacrylate, diisopropylaminoethyl acrylate, t-butylmethylaminoethyl acrylate, 2(di-n-propylamino)-1-methylethyl acrylate or dimethylaminoethyl acrylate, is, in combination with, for example, 3-mercapto-1,2-propanediol, polymerized in the presence of azobisisobutyronitrile, azobisisovaleronitrile, benzoyl peroxide or like initiators.

In this case, methacrylates or acrylates that contain no perfluoroalkyl, e.g., butyl acrylate, methyl methacrylate, butyl methacrylate and ethyl acrylate or, further, other copolymerizable vinyl monomers may be used in combination, within limits not to impair the purpose of the present invention.

There is no particular limitation to the molecular weight of the tertiary amino group-containing diol (A) used, but it is desirably in a range of 400 to 20,000, more preferably 500 to 4,000, depending on the monomer used though. If the molecular weight is too high, exceeding 20,000, there will sometimes tend to form polymers having no hydroxyl group, which is not effectively used in the resulting polyurethane, and become a trouble in carrying out commercial production.

The polymer diol (B) used in the present invention is selected from the group consisting of polyesters, polycarbonates, polylactones and polyethers. The polymer diol (B) has a number average molecular weight in a range of 500 to 3,000 and preferably in a range of 700 to 2,500.

With a molecular weight of less than 500, the resulting polyurethane tends to be of reduced softness or of poor heat resistance. With the molecular weight exceeding 3,000, which necessarily decreases the urethane group concentration, it is difficult to obtain a polyurethane resin having well-balanced characteristics of mechanical properties, flexibility, resistance to coldness and heat and durability and, besides, commercial production of such a polymer diol itself has some problems. Low molecular weight diols having a molecular weight of less than 500 may be used admixedly within limits not to impair the purpose of the present invention. However, it is not desirable that low molecular weight linear diols, such as ethylene glycol, butanediol and hexanediol and aromatic diols such as xylylene glycol, that are generally used as chain extenders, be substantially present, in view of the mechanical properties, flexibility, resistance to coldness and like properties of the resulting polyurethane.

Polycarbonate diols can be obtained, for example, by reacting a carbonate with a diol. Examples of carbonates usable for this purpose are dimethyl carbonate, diphenyl carbonate and ethylene carbonate. Examples of usable diols are aliphatic diols, e.g., ethylene glycol, propylene glycol, butanediol, neopentyl glycol, methylpentanediol, hexanediol, heptanediol, octanediol, nonanediol, decanediol and dodecanediol, which diols may be substituted with a lower alcohol; alicyclic diols, e.g., cyclohexanediol and hydrogenated xylylene glycol and aromatic diols such as xylylene glycol. These diols may be used singly or in combination of 2 or more. Among these diols, aliphatic diols, in particular those having 4 to 9 carbon atoms, e.g., butanediol, methylpentanediol, hexanediol, heptanediol, methyloctanediol and nonanediol are preferably used, either singly or in combination of 2 or more.

The polyester diols usable in the present invention are obtained, for example, by reacting a dibasic acid with a diol. Examples of dibasic acids usable for this purpose are aliphatic dibasic acids, e.g., succinic acid, glutaric acid, adipic acid, pimelic acid, suberic acid, azelaic acid, sebacic acid and brassylic acid and aromatic dibasic acids, e.g., isophthalic acid, terephthalic acid and naphthalenedicarboxylic acid. These dibasic acids may be used singly or in combination of 2 or more. Among these dibasic acids, aliphatic ones, in particular those having 4 to 8 methylene chain carbon atoms, such as adipic acid, pimelic acid, suberic acid, azelaic acid and sebacic acid are preferred. Examples of usable diols are aliphatic diols, e.g., ethylene glycol, propylene glycol, butanediol, neopentyl glycol, methylpentanediol, hexanediol, heptanediol, octanediol, nonanediol, decanediol and dodecanediol, which diols may be substituted with a lower alcohol; alicyclic diols, e.g., cyclohexanediol and hydrogenated xylylene glycol and aromatic diols such as xylylene glycol. These diols may be used singly or in combination of 2 or more. Among these diols, aliphatic diols, in particular those having 4 to 9 carbon atoms, e.g., butanediol, methylpentanediol, hexanediol, heptanediol, methyloctanediol and nonanediol are preferably used, either singly or in combination of 2 or more.

Examples of usable polylactone diols are poly-ε-caprolactonediol, poly-trimethyl-ε-caprolactonediol and poly-β-methyl -δ-valerolactonediol.

Examples of usable polyether diols are polytetramethylene glycol, polypropylene glycol and polyethylene glycol.

Examples of the organic diisocyanate (C1) used in the invention are aromatic diisocyanates, e.g., diphenylmethane-4,4'-diisocyanate, 2,4- or 2,6-tolylene diisocyanate, m-or p-phenylene diisocyanate and 1,5-naphthalene diisocyanate and non-aromatic diisocyanates, e.g., isophorone diisocyanate, cyclohexane diisocyanate, xylylene diisocyanate, hexamethylene diisocyanate and hydrogenated diphenylmethane-4,4'-diisocyanate. Among these diisocyanates, diphenylmethane-4,4'-diisocyanate, isophorone diisocyanate and 2,4-or 2,6-tolylene diisocyanate are particularly preferred, since the resulting sheet materials obtained after coagulation with a non-solvent for the resulting polyurethane have good surface appearance and hand.

The intermediate product diol (D) with its ends substantially being OH used in the invention substantially constitutes the soft segments of the resulting polyurethane.

The diol (D) is obtained by reacting component (A), a polymer diol (B) and an organic diisocyanate (C1) in such a molar ratio as to make the equivalent ratio NCO/OH be in a ratio of 0.5 to 0.99. If the ratio NCO/OM is less than 0.5, the resulting leather-like sheet will hardly be provided with well-balanced characteristics of surface slimy touch, hand, flexibility, resistance to cold and heat resistance, so that the effect of the present invention cannot be produced sufficiently. This is considered to be due to too small an amount of urethane bonds incorporated into the intermediate product diol with its ends substantially being OH and, further, to too low a molecular weight of the intermediate product diol (D), although this tendency varies depending on the amount of component (A) incorporated, the molecular weight of the polymer diol (B) and type of the organic diisocyanate (C1). If the ratio NCO/OH exceeds 0.99, the resulting leather-like sheet will hardly be provided with well-balanced characteristics of surface quality, hand, flexibility, resistance to cold and heat resistance. This is attributable to too large an amount of urethane bonds incorporated into the intermediate product diol with its ends substantially being OH or to too high a molecular weight of the intermediate product diol (D), although this tendency varies depending on the amount of component (A) incorporated, the molecular weight of the polymer diol (B) and type of the organic diisocyanate (C1).

Examples of low molecular weight diols (E) usable in the present invention are aliphatic diols, e.g., ethylene glycol, propylene glycol, butanediol, neopentyl glycol, methylpentanediol, hexanediol, heptanediol, octanediol, nonanediol, decanediol and dodecanediol, which diols may be substituted with a lower alcohol; alicyclic diols, e.g., cyclohexanediol and hydrogenated xylylene glycol, aromatic diols such as xylylene glycol; and diethylene glycol. These diols may be used singly or in combination of 2 or more. Among these diols, aliphatic diols, in particular ethylene glycol and butanediol are preferably used, in view of achievement of good balance between the hand, flexibility, resistance to coldness and heat and like properties.

Although there is no particular limitation to the amount of the low molecular weight diol (E) used, it is often desirably in a range of molar ratio of (E)/(B), i.e. based on polymer diol (B), of 0.5 to 7.0, in particular in a range of 1.0 to 5.5, in view of achievement of good hand, flexibility and resistance to coldness and heat. However, the preferred range differs depending on the amount of component (A) incorporated, the molecular weight of the polymer diol (B), the type of the organic diisocyanate (C1) and the NCO/OH ratio.

Although there is no particular limitation to the amount of diphenylmethane-4,4'-diisocyanate used, the molar ratio of NCO/OH, i.e. the molar ratio between NCO from (C1) and (C2) and OH from the amino group-containing diol (A), polymer diol (A) and low molecular weight diol (D) is desirably in a range of 0.95 to 1.2, more preferably in a range of 0.97 to 1.1. However, the preferred range differs depending on the intended viscosity of the polyurethane solution, the molecular weights of the amino group-containing diol (A) and polymer diol (B), the molar ratio NCO/OH of the amino group-containing diol (A), polymer diol (B) and organic diisocyanate (C1), the water content in the reaction solvent used, polymer diol (B) and low molecular weight diol (D), and like factors.

While no catalyst is necessarily used upon conducting polymerization process used in the present invention, it is possible to use an optional catalyst selected from known ones used for producing ordinary polyurethanes, e.g., metal compounds such as titanium tetraisopropoxide, dibutyltin dilaurate and tin octate and tertiary amines such as tetramethylbutanediamine and 1,4-diaza(2,2,2)bicyclooctane.

The usual solvents are usable for the polyurethanes obtained by the process of the present invention, and their examples are dimethylformamide, dimethylacetamide, N-methylpyrrolidone, toluene, ethyl acetate, methyl ethyl ketone and tetrahydrofuran.

As described above, using a polyurethane having introduced into the soft segments thereof a tertiary amino group-containing diol and impregnating a fiber-entangled nonwoven fabric with a solution of this polyurethane and wet coagulating it can provide a leather-like sheet having excellent dyeability, soft hand and excellent durability. However, in order to obtain a leather-like sheet having a gentle hand and tactility still closer to that of natural leather, it is desirable to replace part of the above polyurethane by another polyurethane comprising, as soft segment component, a polymer diol having polydimethylsiloxane skeleton (hereinafter this polyurethane is referred to as "polydimethyl-siloxane modified polyurethane).

Natural leather has a gentle tactility and hand. A leather-like sheet will, when provided with the gentle tactility and hand, posses high quality natural leather-like hand and tactility. To provide this type of tactility and hand, it is generally desirable to keep fibers constituting the nonwoven fabric and the polyurethane impregnating it in the condition of being substantially unbonded together, i.e., a separated condition. Leather-like sheets utilizing the polyurethane having introduced into the soft segments thereof a tertiary amino group-containing diol are inferior in the gentle tactility and hand. This is attributable to the fact that in the impregnated entangled nonwoven fabric the constituting fibers and the polyurethane contained therein are, in a sense delaminated though, only insufficiently delaminated from each other. Use of the polyurethane (a) in combination with a polydimethylsiloxane-modified polyurethane (b) can prevent adhesion of the fibers with the polyurethane composition more effectively.

The polydimethylsiloxane modified polyurethane is obtained from a polymer diol having polydimethylsiloxane skeleton, a chain extender and an organic diisocyanate.

The polymer diol having polydimethylsiloxane skeleton is a diol having a number average molecular weight of 1,000 to 10,000 and having structural units from dimethylsiloxane and represented by the following general formula

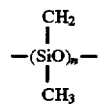

wherein n is a number of, desirably, 10 to 100.

If the number average molecular weight is less than 1,000, the polymer diol will influence the arrangement of hard segments formed by the organic diisocyanate and chain extender used, so that the heat resistance and the solvent resistance become poor. On the other hand, if the number average molecular weight exceeds 10,000, there cannot be obtained a stable polyurethane solution. The number average is more preferably within a range of 1,500 to 8,000. The repeating number of dimethylsiloxane unit (n in the above formula) is desirably in a range of 10 to 100, more preferably in a range of 12 to 80. With an n of less than 10, the resulting leather-like sheet cannot possess the gentle hand and tactility intended by the present invention. On the other hand, an n exceeding 100 cannot give a stable polyurethane having good compatibility with other polyurethanes.

Part of the methyl groups of the above dimethylsiloxane units may be replaced by a phenyl or like groups. Also, the polymer diol having polydimethylsiloxane skeleton may be modified by copolymerization with an alkylene oxide such as ethylene oxide or polypropylene oxide within a limit not to impair the effect of the present invention. The polydimethylsiloxane modified polyurethane may contain, as part of its soft segments, polymer diols other than the polymer diol having polydimethylsiloxane skeleton, such as polyester diols, polycarbonate diols, polylactone diols and polyether diols having a number average molecular weight of 500 to 3,000. These polymer diols may be present in an amount of not more than 50% by weight based on the weight of the total polymer diols contains. More preferably, the content of the silicon atom in the total polymer diols constituting the polydimethylsiloxane-modified polyurethane is in a range of 1 to 40% by weight, particularly in a range of 10 to 40% by weight.

Examples of the organic diisocyanate (C3) used for producing the polydimethylsiloxane modified polyurethane are those as described above for (C1), i.e., aromatic diisocyanates, e.g., diphenylmethane-4,4'-diisocyanate and 2,4 or 2,6-tolylene diisocyanate; alicyclic diisocyanates, e.g., dicyclohexyl-methane-4,4'-diisocyanate and cyclohexane diisocyanate; and aliphatic diisocyanates, e.g., hexamethylene diisocyanate.

Examples of the chain extender used for producing the poly-dimethylsiloxane-modified polyurethane are aliphatic based low molecular diols and diamines, e.g., ethylene glycol, butanediol and ethylenediamine; alicyclic-based low molecular diols and diamines, e.g., isophoronediamine, 4,4'-diamino-dicyclohexylmethane and cyclo-hexanediol; and aromatic-based low molecular diols and diamines, e.g., xylene glycol and 4,4' diaminodiphenylmethane.

Particularly preferred combinations of an organic diisocyanate and a chain extender are: diphenylmethane-4,4' diisocyanate and ethylene glycol, diphenylmethane-4,4'-diisocyanate and butanediol, isophorone diisocyanate and isophoronediamine and dicyclohexyl -methane-4,4'-diisocyanate and isophoronediamine. These combinations can produce leather like sheets having a particularly gentle tactility and hand, closely resembling natural leather.

In the present invention, as stated above, use of a mixed polyurethane comprising a polyurethane having introduced into the soft segments thereof a tertiary amino group-containing diol and a polydimethylsiloxane modified polyurethane is preferred. In this case, it is desirable to mix the polydimethylsiloxane-modified polyurethane in an amount of 0.5 to 50% by weight based on the weight of the polyurethane having introduced into the soft segments thereof a tertiary amino group-containing diol. If the amount mixed is less than 0.5% by weight, there cannot be produced the effect of the mixing, i.e., a more gentle hand and tactility closely resembling that of natural leather. On the other hand, if the amount exceeds 50% by weight, the polydimethylsiloxane-modified polyurethane will dissolve out or the obtained leather like sheet will be elongated to a large extend, upon conversion of fibers constituting the nonwoven fabric into ultrafine fiber bundles by extracting one component thereof. The amount mixed is more preferably in a range of 1 to 30% by weight.

Further in the present invention, it is desirable to use a polydimethylsiloxane-modified polyurethane having a solubility in toluene of not more than 50% by weight. If the toluene solubility exceeds 50% by weight, the resulting leather-like sheet will become rubber-like and never have a low-resilient, gentle hand and tactility closely resembling natural leather. The toluene solubility, which differs to some extent depending on the type of the polymer diol, organic diisocyanate of chain extender constituting the polyurethane though, depends mostly on the ratio between the moles of the chain extender and the moles of the polymer diol. That is, increasing the molar ratio of the chain extender decreases the toluene solubility. Concretely, it is desirable to set the molar ratio of the chain extender to the polymer diol at least 0.5. It has been, in general, considered that: increasing the molar ratio of the chain extender to the polymer diol constituting a polyurethane hardens the polyurethane, and use of a softer polyurethane is desirable for obtaining a gentle tactility and hand closely resembling natural leather. In actuality, in the present invention, it is preferred that the polydimethylsiloxane modified polyurethane used have a high molar ratio of the chain extender, which is just the reverse of the above conventional wisdom.

The toluene solubility is determined by the following method.

A polydimethylsiloxane modified polyurethane sample is dissolved in dimethylformamide to a viscosity of 10 poises (or, if this viscosity is not attainable, a maximum viscosity at which the solution can be formed into film). The solution is casted onto a smooth release paper in such an amount as to permit the thickness after drying to become 200 μm, then dried at 90° C. for 12 hours and vacuum dried at 90° C. for 2 hours, to give a film. The film obtained is further dried at 108° C. for 2 hours and cooled, and measured for the weight ($W_1$). The film is then immersed in 50 times by weight of its weight of toluene at 20° C. for 5 hours. During the immersion, once per 30 minutes the toluene is lightly shaken twice horizontally. After the immersion, the film is taken out from the toluene, dried at 110° C. for 2 hours, cooled and measured for the weight ($W_2$). The toluene solubility is obtained by: $100 \times (W_1 - W_2)/W_1$.

It may be expected that use of a polymer diol having poly-dimethylsiloxane skeleton as one component of soft segment components constituting a polyurethane having introduced into the soft segments thereof a tertiary amino group containing diol could produce the same effect as that produced by the use of a mixed polyurethane, according to the present invention, of a polyurethane having introduced into the soft segments thereof a tertiary amino group-containing diol and a polydimethylsiloxane modified polyurethane. In actuality, in the above case, upon wet coagulation after impregnation of a nonwoven fabric with a solution of the polyurethane, the polyurethane coagulates into a non-porous condition, so that the resulting leather-like sheet has a high specific gravity and becomes hard. As a result, the desired natural leather-like hand or tactility cannot be obtained.

In the present invention, the polyurethane is used in the state of solution. It is known that the crosslinkable polyurethane is used in the state of emulsion and after the impregnation the polyurethane is crosslinked by heating. However, in this case the sheet having a natural-leather like soft hand and low-resilient can not be obtained.

In the present invention, it is desirable, in order to obtain a natural leather-like gentle hand, that the polyurethane used be not present inside the ultrafine fiber bundles and that the ultrafine fibers and the polyurethane be substantially not bonded together. For this purpose, as described heretofore, a polydimethylsiloxane modified polyurethane is used in combination. In addition to this means, there is employed a process which comprises, after impregnating a non-woven fabric with a polyurethane solution and wet coagulating it, treating the counterpart polymer component of the ultrafine fiber-forming fibers with a solvent to convert them into ultrafine fibers. The counterpart polymer component resin used is therefore preferably selected from resins that are readily extractable with a solvent. Concretely, there can be used as counterpart polymer component vinyl polymers, preferably polyolefins or polystyrene, in particular polyethylene-based resins. Toluene, trichloroethane or the like is used as the solvent for extraction treatment. With any one of these solvents being used, it is important that the polydimethylsiloxane-modified polyurethane used have a toluene solubility of not more than 50%. The toluene solubility is more preferably not more than 40%.

In the present invention, the polymer diol having polydimethyl siloxane skeleton should be incorporated into the structure of the polyurethane. If a polyurethane having introduced into the soft segments thereof a tertiary amino group-containing diol and a polymer having polydimethylsiloxane skeleton are simply mixed and used, the polyurethane and the polymer having polymethylsiloxane skeleton will be poorly compatible with each other, thereby giving no leather-like sheet having stable properties. Further in this case, the polymer having polydimethylsiloxane skeleton will, as time goes on, bleed out on the surface of the leather-like sheet, thereby causing the surface to become sticky or absorb dust.

It is known that application of a polyurethane modified with a polyol having polydimethylsiloxane skeleton on the surface of leather like sheets with grain surface layer, in order to improve the water-repellency or abrasion resistance of the surface ( see, for example, Japanese Patent Publication 14478/1967). However, this known art is to improve the grain surface and it essentially different from the art of the present invention, which is intended to improve the inside, i.e., base layer, of suede-tone leather-like sheets.

It is also known that application of a polyurethane to which an additive comprising a polyalkylene-modified dimethylpolysiloxane and an organic diisocyanate has been added, on a fibrous sheet and then conducting wet coagulation can produce a porous sheet having uniform, fine pores (Japanese Patent Application Laid-open No. 144318/1985). However, the additive used in this art which comprises a polyalkylene-modified dimethylpolysiloxane and an organic diisocyanate, and no chain extender, has a markedly high toluene solubility as defined above and causes, when applied to the present invention, the resulting leather-like sheet to become rubber-like. As a result, there can be obtained no low-resilient leather-like sheet having a gentle and tactility closely resembling natural leather.

To summarize, there is found no known literature describing use of the above polydimethylsiloxane-modified polyurethane as one component of a polyurethane for impregnation to obtain a suede-tone leather-like sheet having a fibrous nap on the surface or use of a polyurethane having introduced into the soft segments thereof a tertiary amino group containing diol as the polyurethane to be added, in a system to which the polydimethylsiloxane-modified polyurethane is added, or describing such uses improving the hand or tactility of the leather like sheet.

The polyurethanes obtained by the process according to the present invention may, upon use, incorporate various additives usable for conventional polyurethanes, e.g., flame retardants such as phosphorus-based compounds, halogen-containing compounds, antioxidants, UV-absorbers, pigments, dyes, plasticizers and surfactants.

The fibrous base used for the leather-like sheet according to the present invention need not comprise dyed fibers where the sheet is a grain type one having on the surface of the base a surface layer of the above polyurethane, and in this case its constituting fibers are not restricted to those dyeable with acid dyes. However, the constituting fibers are preferably dyeable with acid dyes, to prevent generation of any heterocolor feeling in the cross-section of the leather-like sheet. For suede-type leather-like sheets with raised fibers, the fibrous base may comprise any fibers dyeable with acid dyes and, thus, be any one of knit, woven and nonwoven fabrics formed of synthetic fibers such as polyamide fibers or tertiary amino group-modified polyester fibers or natural fibers such as wool and nonwoven fabric formed of 3-dimensionally entangled bundles of ultrafine fibers having an average fineness of less than. 0.1 denier. As among these, nonwoven fabrics formed of 3-dimensionally entangled bundles of ultrafine fibers having an average fineness of less than 0.1 denier, more particularly 0.005 to 0.1 denier, are preferably used. Ultrafine fibers dyeable with acid dyes can be derived from known polyamide ultrafine fiber-generating fibers comprising at least 2 polymer components including polyamide. The polyamide resin used for the polyamide ultrafine fiber-generating fiber is at least one member selected from the group consisting of 6-nylon, 6,6-nylon, 6,10-nylon, 12-nylon and spinnable polyamides having aromatic rings.

The counterpart polymer to constitute, in combination with polyamide, the ultrafine fiber-generating fiber should differ from the polyamide resin used in solubility or decomposability in the solvent or decomposing agent used, have poor compatibility with the polyamide resin and have a smaller melt viscosity than that of the polyamide resin under the spinning conditions employed. Any polymer satisfying the above requirements can be used and is selected for example from polyethylene, polypropylene, ethylene-propylene copolymer, ethylene-vinyl acetate copolymer, ethylene-acrylic acid ester copolymers, ethylene-α-olefin copolymers, polystyrene, styrene-isoprene copolymer, hydrogenated product of styrene-isoprene copolymer, styrene-butadiene copolymer and hydrogenated product of styrene-butadiene copolymer. The selected polymer and a polyamide are blend-spun by any one of: a process which comprises mixing the two polymers in a prescribed mixing ratio, melting the mix in the same melting zone to obtain a mixed system and spinning the mixed system; one which comprises melting the two polymers in separate melting zones, subjecting the two melts to joining and dividing operation in the spinning head part repeatedly for several times; and one which comprises melting the two polymers in separate melting zones and spinning the two melts while specifying the fiber configuration at the spinneret part. Then, there can be obtained polyamide ultrafine fiber-generating fibers having a polyamide resin content of 40 to 80% by weight, and having therein at least 5 units, preferably 50 to 800 units, of polyamide ultrafine fibers. The ultrafine fiber-generating fibers thus spun are, as required, subjected to the usual fiber treatment process such as drawing and heat setting, to give fibers having a fineness of 2 to 15 deniers and an average polyamide ultrafine fiber fineness (calculated value) of not more than 0.2 denier, preferably 0.005 to 0.1 denier.

The ultrafine fiber-generating fibers are carded into a web, which is then formed into a random web or cross-lapped web through a webber. The web thus obtained is laminated to achieve the desired weight and thickness and, thereafter, subjected to fiber entanglement treatment by needle punching, water jetting, air jetting or like known processes, into a fiber-entangled nonwoven fabric.

The nonwoven fabric thus formed is impregnated and/or coated with, a composition liquid obtained by adding to a solution of the polyurethane obtained above, as required, a coagulation adjusting agent, release agent, plasticizer, stabilizer, antioxidant, UV-absorber, colorant and like additives. The fabric with the liquid is then subjected to wet or dry coagulation. The ultrafine fiber-generating fibers are, prior to or after the above impregnation or coating, treated with a solvent that can dissolve the counterpart resin and is a nonsolvent for the polyamide used, to give bundles of ultrafine fibers.

There is no particular limitation to the amount of the polyurethane resin to be present in the finished sheet, but it is generally 10 to 60% by weight, in particular 15 to 45%. With the polyurethane content being too small, the sheet somewhat has a weak hand lacking KOSHI (stiffness), which becomes more noticeable when the content is less than 10%. On the other hand, with too large a polyurethane content, the sheet tends to have a poor hand with little bulk, which becomes more marked when the content exceeds 60%.

The sheet thus obtained is, as necessary, further coated on the surface thereof with a porous or non-porous coating layer of the same polyurethane, to give a grain type leather-like sheet; or subjected to a napping treatment on at least one surface thereof, to give a raised-fiber suede-type leather-like sheet. If necessary, the sheet can be sliced in the thickness direction at any optional stage, to a desired thickness.

The leather-like sheets thus obtained according to the present invention are useful for various items, e.g., clothing, shoes, bags, furniture, car interior, sundries and the like. The leather-like sheets have excellent hand, with the polyurethane resin maintaining the desirable mechanical properties and processability and being dyeable with what are known as acid dyes, such as acid dyes and metal-complex dyes. The mechanism involved herein is not quite clear, but it is considered to be due to the following. The polyurethane is obtained via an intermediate product diol (D) with both ends thereof substantially being OH and obtained by reacting a tertiary amino group-containing diol (A), a polymer diol (B) having a number average molecular weight of 500 to 3,000 and essentially comprising a polycarbonate and an organic diisocyanate (C1), in such stoichiometric amounts as to make the molar ratio of NCO/OH 0.5 to 0.99, and a low molecular weight diol (E); and hence tertiary amino groups that can accept acid dyes are introduced therein while soft segments and hard segments constituting the polyurethane maintain a state of desirable micro-phase separation. This can give the leather-like sheets impregnated or coated with the very polyurethane the above desirable characteristics. Other features of the invention will become apparent in the course of the following descriptions of exemplary embodiments which are given for illustration of the invention and are not intended to be limiting thereof.

In the Examples and Comparative Examples that follow, various compounds are sometimes abbreviated as follows.

MDEA N-methyldiethanolamine
HEP 1,4bis(2-hydroxyethyl)piperidine
EBDO polymer diol having an average molecular weight of 2,000 and obtained by reacting a 1/1 mixture of dimethylaminoethyl acrylate and butyl acrylate, and 3-mercapto-1,2-propanediol
EEDO polymer diol having an average molecular weight of 2,000 and obtained by reacting a 1/2 mixture of diethylaminoethyl methacrylate and 2-ethyl-hexylmethacrylate, and 3-mercapto-1,2-propanediol
$PHC_{1000}$ polyhexylene carbonate having an average molecular weight of 1,000
$PHC_{2000}$ polyhexylene carbonate having an average molecular weight of 2,000
$PBA_{1000}$ polybutylene adipate having an average molecular weight of 1,000
$PBA_{2000}$ polybutylene adipate having an average molecular weight of 2,000
$PTMG_{2000}$ polytetramethylene glycol having an average molecular weight of 2,000
MDI diphenylmethane-4,4'-diisocyanate
TDI 80/20 by weight mixture of 2,4-tolylene diisocyanate and 2,6-tolylene diisocyanate
EG ethylene glycol
DMF dimethylformamide

EXAMPLE 1

A reaction vessel was charged with 11.9 parts by weight of MDEA as a tertiary amino group-containing diol (A), 620 parts by weight of $PHC_{2000}$, 580 parts by weight of $PBA_{2000}$ and 600 parts by weight of $PTMG_{2000}$, as a polymer diol (B), 1188 parts by weight of MDI as an organic diisocyanate (C1), (NCO/OH=0.75), and 9117 parts by weight of DMF. The mixture was reacted at a temperature of 70° C. under an atmosphere of nitrogen for 5 hours, to give an intermediate product. Disappearance of isocyanate groups was confirmed. The intermediate product was tested by GPC for weight average molecular weight (as converted into polystyrene), which was found to be 40,000.

To a solution of the thus obtained intermediate product diol (D) in DMF, there were added 186 parts by weight of EG as a low molecular weight diol (E) and 853 parts by weight of MDI (C2), and the mixture was reacted to give a solution of a polyurethane having a weight average molecular weight of 360,000 in a concentration of 25%. A composition liquid for impregnation was prepared by adding to 100 parts by weight of the thus obtained polyurethane solution 92 parts by weight of DMF, 1.5 parts by weight of CRISVON ASSISTOR SD7® (trade name; Dainippon Ink & Chemicals, Inc.) and 1.5 parts by weight of CRISVON ASSISTOR SD14® (trade name; Dainippon Ink & Chemicals, Inc.).

Separately, a web was formed by carding ultrafine fiber-generating fibers (ultrafine fiber component: 6-nylon) obtained by melt blend spinning of 60 parts by weight of 6-nylon and 40 parts by weight of a highly flowable polyethylene. The web was formed into a needle-punched entangled nonwoven fabric. The nonwoven fabric was impregnated with the composition liquid prepared above and then immersed in a 25% aqueous DMF solution to effect coagulation. The nonwoven fabric with the resin was treated in hot toluene to dissolve off the polyethylene component of the fibers, to give a sheet having a thickness of 1.4 mm. The sheet thus obtained was sliced into two parts, each of which was buffed with a sandpaper on the sliced surface to a thickness of 0.56 mm. Then the coagulated surface was treated with an Emery buffer to form a nap.

The sheet with a napped surface was dyed under the following conditions, to give a leather-like sheet dyed in a bright color and having a good hand. The dyed leather-like sheet showed a color fastness, that to washing and that to rubbing, of both at least class 5, which were excellent.

Dye: Kayacyl Blue HRL
Dye concentration: 5.0 g/l
Ammonium acetate: 0.6 g/l
Formic acid: 1.0 g/l
Bath ratio :50:1

EXAMPLE 2 AND COMPARATIVE EXAMPLES 1 AND 2

The procedure of Example 1 was followed except that the starting material composition was changed as shown in Table 1, to obtain 25% polyurethane solutions.

Dyed leather-like sheets with a napped surface were obtained by using the polyurethane solutions in the same manner as in Example 1, and evaluated in the same manner.

Although fibrous base part of the sheet obtained in Comparative Example 1 had been dyed to some level, the polyurethane part had been dyed only insufficiently, whereby the entire sheet had a poor appearance. Comparison with the results of Example 1 clearly shows the good effect of using a tertiary amino group-containing diol (A) according to the present invention.

The sheet obtained in Example 2 showed a bright color and gave a good hand.

On the other hand, in Comparative Example 2, the sheet after being treated in hot toluene to dissolve off polyethylene component was too stiff and had a too coarse touch to be called a leather-like sheet.

Thus, the use of the polyurethane obtained via an intermediate product obtained by reacting a tertiary amino group-containing diol (A), a polymer diol (B) and an organic diisocyanate (C1) in a molar ratio of NCO/OH of 0.12 could not yield a sheet having a good hand. This fact clearly shows, upon comparison with the results of Example 2, the superiority of the technique according to the present invention, which uses a polyurethane obtained via an intermediate product (D) obtained by reacting a tertiary amino group-containing diol (A), a polymer diol (B) and an organic diisocyanate (C1) in a molar ratio of NCO/OH of at least 0.5.

Comparative Example 3

A reaction vessel was charged, at the same time, with starting materials with the same composition as that in Example 2, and the mixture was reacted at 80° C. under an atmosphere of nitrogen for 8 hours, to give a solution of a polyurethane having an weight average molecular weight of 380,000 in a concentration of 25%. Thereafter, the procedure of Example 1 was followed except that the obtained polyurethane solution was used. However, the sheet after being treated in hot toluene to dissolve off polyethylene component was too stiff and had a too coarse touch to be called a leather-like sheet.

Thus, the use of the polyurethane obtained without via an intermediate product (D) obtained by reacting a tertiary amino group-containing diol (A), a polymer diol (B) and an organic diisocyanate (C1) could not yield a sheet having a good hand. This fact clearly shows, upon comparison with the results of Example 2, the superiority of the technique that uses a polyurethane obtained via an intermediate product (D) according to the present invention.

TABLE 1

| | Prepolymer | | | | | | | Polyurethane | | | |
|---|---|---|---|---|---|---|---|---|---|---|---|
| | Tertiary amino group-containing diol (A) | | Polymer diol (B) | | Organic diisocyanate (C1) | NCO/OH | DMF | Weight average molecular weight ($\times 10^3$) | Low molecular weight diol (E) | MDI (C2) | Concentration (%) | Weight average molecular weight ($\times 10^3$) |
| Example 1 | MDEA | 11.9 | PHC$_{2000}$ PBA$_{2000}$ PTMG$_{2000}$ | 620 580 600 | MDI | 188 | 0.75 | 9117 | 40 | EG 186 | 853 | 25 | 360 |
| Comparative Example 1 | — | | PHC$_{2000}$ PBA$_{2000}$ PTMG$_{2000}$ | 690 644 666 | MDI | 188 | 0.75 | 9672 | 41 | EG 186 | 850 | 25 | 350 |
| Example 2 | MDEA | 11.9 | PHC$_{1000}$ PBA$_{1000}$ | 350 550 | TDI | 165 | 0.95 | 4944 | 67 | EG 106 | 471 | 25 | 380 |
| Comparative Example 2 | MDEA | 11.9 | PHC$_{1000}$ PBA$_{1000}$ | 350 550 | TDI | 35 | 0.20 | 5135 | 12 | EG 106 | 659 | 25 | 360 |
| Example 3 | HEP | 26.1 | PHC$_{2000}$ PBA$_{2000}$ | 600 1100 | MDI | 200 | 0.80 | 10593 | 48 | EG 295 | 1310 | 25 | 370 |
| Comparative Example 4 | HEP | 26.1 | PHC$_{2000}$ PBA$_{2000}$ | 600 1100 | MDI | 256 | 1.02 | 10593 | 220 | EG 295 | 1254 | 25 | 390 |
| Example 4 | EBDO | 200 | PHC$_{1000}$ PBA$_{1000}$ | 300 600 | TDI | 165 | 0.95 | 5490 | 65 | EG 106 | 459 | 25 | 350 |
| Comparative Example 6 | — | | PHC$_{1000}$ PBA$_{1000}$ | 333 667 | TDI | 165 | 0.95 | 5190 | 62 | EG 106 | 458 | 25 | 340 |
| Comparative Example 8 | EBDO | 200 | PHC$_{1000}$ PBA$_{1000}$ | 300 600 | TDI | 35 | 0.20 | 5665 | 11 | EG 106 | 647 | 25 | 340 |
| Example 5 | EEDO | 100 | PHC$_{2000}$ PBA$_{2000}$ | 600 1300 | MDI | 188 | 0.75 | 10620 | 43 | EG 248 | 1105 | 25 | 320 |
| Comparative Example 9 | EEDO | 100 | PHC$_{2000}$ PBA$_{2000}$ | 600 1300 | MDI | 256 | 1.02 | 10620 | 240 | EG 248 | 1042 | 25 | 330 |

TABLE 1-continued

| | Prepolymer | | | | | | | Polyurethane | | | |
|---|---|---|---|---|---|---|---|---|---|---|---|
| | Tertiary amino group-containing diol (A) | | Polymer diol (B) | | Organic diiso-cyanate (C1) | | NCO/OH | DMF | Weight average molecular weight ($\times 10^3$) | Low molecular weight diol (E) | MDI (C2) | Concen-tration (%) | Weight average molecular weight ($\times 10^3$) |
| Example 6 | EBDO | 200 | PHC$_{2000}$ PBA$_{2000}$ | 800 1000 | MDI | 200 | 0.80 | 9680 | 48 | EG 186 | 840 | 25 | 320 |
| Example 6 | EBDO | 200 | PHC$_{2000}$ PBA$_{2000}$ | 800 1000 | MDI | 200 | 0.80 | 9680 | 48 | EG 186 | 840 | 25 | 320 |

Example 3 and Comparative Example 4

The procedure of Example 1 was followed except that the starting material composition was changed as shown in Table 1, to obtain 25% polyurethane solutions.

Composition liquids for coating were prepared by adding to 100 parts by weight of the thus obtained polyurethane solutions 19 parts by weight of DMF, 1.5 parts by weight of CRISVON ASSISTOR SD7® (trade name; Dainippon Ink & Chemicals, Inc.) and 1.5 parts by weight of CRISVON ASSISTOR SD14® (trade name; Dainippon Ink & Chemicals, Inc.).

The same entangled nonwoven fabric as used in Example 1 was, at first, impregnated with the composition liquid used in Example 1, then coated with the above coating liquids to a thickness of 0.5 mm and, thereafter, immersed in a 25% aqueous DMF solution to effect coagulation. The two nonwoven fabrics thus impregnated and coated were treated in hot toluene to dissolve off the polyethylene component of the fibers, to give two sheets with a grain surface and having a thickness of 2.2 mm and a good hand. These sheets were dyed in the same manner as in Example 1 and the dyed sheets were evaluated. While the sheet of Example 3 had been dyed in a bright color, that of Comparative Example 4 was stiff and had a poor hand with poorly foamed grain surface. Thus, the use of the polyurethane obtained via an intermediate product obtained by reacting a tertiary amino group-containing diol (A), a polymer diol (B) and an organic diisocyanate (C1) in a molar ratio of NCO/OH of 1.02 could not yield a sheet having a good hand. This fact clearly shows, upon comparison with the results of Example 3, the superiority of the technique according to the present invention, which uses a polyurethane obtained via an intermediate product (D) obtained by reacting a tertiary amino group-containing diol (A), a polymer diol (B) and an organic diisocyanate (C1) in a molar ratio of NCO/OH of not more than 0.99.

Comparative Example 5

A reaction vessel was charged with 26.1 parts by weight of HEP, 50 parts by weight of PBA$_{2000}$, 35 parts by weight of MD, (NCO/OH=0.80), and 340 parts by weight of DMF, and the mixture was reacted at 80° C. under an atmosphere of nitrogen for 5 hours, to give an intermediate product having a weight average molecular weight as converted into polystyrene of 60,000.

To the obtained solution of the intermediate product in DMF, there were added 600 parts by weight of PBA$_{2000}$, 1,050 parts by weight of PBA$_{2000}$, 1,475 parts by weight of MDI, 295 parts by weight of EG and 10,253 parts by weight of DMF, and the mixture was reacted to give a solution of a polyurethane having an weight average molecular weight of 360,000 in a concentration of 25%.

Thereafter, the procedure of Example 3 was followed except that the obtained polyurethane solution was used to prepare a coating solution, to obtain a grain-type sheet. The sheet, the grain surface having many minute projections, had a poor appearance and a stiff hand.

EXAMPLE 4 AND COMPARATIVE EXAMPLE 6

The procedure of Example 1 was followed except that the starting material composition was changed as shown in Table 1, to obtain 25% polyurethane solutions.

The procedure of Example 1 was followed with the obtained polyurethane solutions to prepare composition liquids for impregnation.

The same entangled nonwoven fabric as used in Example 1 was impregnated with each of these composition liquids separately, and then treated in the same manner as in Example 1, to give sheets having a napped surface.

The sheets with a napped surface were dyed under the following conditions and evaluated. The sheet of Example 4 was found to be a leather-like sheet dyed in a bright color and having a good hand. On the other hand, although the fibrous base part of the sheet obtained in Comparative Example 5 was dyed to some level, the polyurethane part was dyed only insufficiently, whereby the entire sheet had a poor appearance. Thus, the superiority of the present invention is clear.

Dye: Acidol Brill. Blue BX-NW

Dye concentration: 3.0 g/l

Uniperol SE-S: 1.0 g/l

Acetic acid: 0.3 g/l

Bath ratio: 20:1

Temperature: 95° C.

Time: 60 minutes

Comparative Example 7

A reaction vessel was charged, at the same time, with staring materials with the same composition as that in Example 4, and the mixture was reacted at a prescribed temperature under an atmosphere of nitrogen for a prescribed time, to give a solution of a polyurethane having a weight average molecular weight of 330,000 in a concentration of 25%. Thereafter, the procedure of Example 4 was followed except that the obtained polyurethane solution was used, to prepare a composition liquid for impregnation.

The entangled nonwoven fabric was treated with this solution in the same manner. Then, it appeared that the sheet after being treated in hot toluene to dissolve off polyethylene component was too stiff and had a too coarse touch to be called a leather-like sheet. Thus, the use of the polyurethane obtained without via an intermediate product (D) obtained by reacting a tertiary amino group-containing diol (A) a polymer diol (B) and an organic diisocyanate (C1) could not yield a sheet having a good hand. This fact clearly shows, upon comparison with the results of Example 4, the superiority of the technique that uses a polyurethane obtained via an intermediate product (D) according to the present invention.

Comparative Example 8

The procedure of Example 4 was followed except that the starting material composition was changed as shown in Table 1, to obtain a 25% solution of a polyurethane having a weight average molecular weight of 340,000.

Thereafter, the procedure of Example 4 was followed except that the obtained polyurethane solution was used, to prepare a composition liquid for impregnation.

The procedure of Example 4 was further followed except that the liquid for impregnation prepared above was used. Then, it turned out that the sheet after being treated in hot toluene to dissolve off polyethylene component was too stiff and had a too coarse touch to be called a leather-like sheet. Thus, the use of the polyurethane obtained via an intermediate product obtained by reacting a tertiary amino group-containing diol (A), a polymer diol (B) and an organic diisocyanate (C1) in a molar ratio of NCO/OH of 0.2 could not yield a sheet having a good hand. This fact clearly shows, upon comparison with the results of Example 4, the superiority of the technique that uses a polyurethane obtained via an intermediate product (D) obtained by reacting a tertiary amino group-containing diol (A), a polymer diol (B) and an organic diisocyanate (C1) in a molar ratio of NCO/OH of at least 0.5.

EXAMPLE 5

The procedure of Example 3 was followed except that the starting material composition was changed as shown in Table 1, to obtain a 25% solution of a polyurethane having a weight average molecular weight of 320,000.

A composition liquid for coating was prepared using the obtained polyurethane solution in the same manner as in Example 3.

The same entangled nonwoven fabric as used in Example 4 was, at first, impregnated with the composition liquid used in Example 4, then coated with the above coating liquid to a thickness of 0.5 mm prepared above and, thereafter, immersed in a 25% aqueous DMF solution to effect coagulation. The nonwoven fabric thus impregnated and coated was treated in hot toluene to dissolve off the polyethylene component of the fibers, to give a sheet with a grain surface and having a thickness of 2.2 mm and a good hand. The sheet was dyed in the same manner as in Example 4, to show a bright color, which clearly shows the superiority of the present invention.

Comparative Example 9

The procedure of Example 5 was followed except that the starting material composition was changed as shown in Table 1, to obtain a 25% solution of a polyurethane having a weight average molecular weight of 330,000.

Thereafter, the procedure of Example 5 was followed except that the obtained polyurethane solution was used, to obtain a grain-type sheet. The sheet, the grain surface being poorly foamed, was stiff and had a poor hand. Thus, the use of the polyurethane obtained via an intermediate product obtained by reacting a tertiary amino group-containing diol (A), a polymer diol (B) and an organic diisocyanate (C1) in a molar ratio of NCO/OH of 1.02 could not yield a sheet having a good hand. This fact clearly shows, upon comparison with the results of Example 5, the superiority of the technique that uses a polyurethane obtained via an intermediate product (D) obtained by reacting a sulfonic acid group-containing diol (A), a polymer diol (B) and an organic diisocyanate (C1) in a molar ratio of NCO/OH of not more than 0.99.

EXAMPLE 6

The procedure of Example 1 was followed except that the starting material composition was changed as shown in Table 1, to obtain a 25% solution of a polyurethane having a weight average molecular weight of 320,000.

A composition liquid for impregnation was prepared using the obtained polyurethane solution in the same manner as in Example 1.

The same entangled nonwoven fabric as used in Example 4 was impregnated with the composition liquid and then immersed in a 25% aqueous DMF solution to effect coagulation. The nonwoven fabric thus impregnated was treated in hot toluene to dissolve off the polyethylene component, to give a sheet. The sheet had a hand sufficient for practical purposes, being somewhat stiff though. The sheet was dyed in the same manner as in Example 4, to show a bright color, which clearly shows the superiority of the present invention.

Process for producing polydimethylsiloxane modified polyurethane (b-1).

A three-neck flask equipped with Dimroth condenser was charged with 1,200 parts by weight of the polymer diol having a number average molecular weight of 1,850 and shown by the following formula 4, 340 parts by weight of diphenyl-methane-4,4'-diisocyanate and 40 parts by weight of ethylene glycol (molar ratio to the polymer diol:1.0) and a solvent of 3,650 parts by weight of dimethylformamide. The mixture was reacted under an atmosphere of nitrogen at 85° C. for 10 hours, to give a polyurethane solution. The polyurethane solution thus obtained had a solid concentration and a viscosity measured with a B-type viscometer at 30° C. of 30% by weight and 1,480 cps, respectively. The toluene solubility of the polyurethane was found to be 12% by weight.

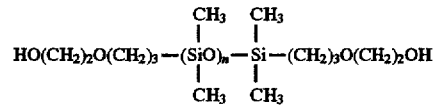

wherein n is 20.5 in an average and the content of Si in the polymer diol is 36.1% by weight.

Process for producing polydimethylsiloxane-modified polyurethane (b-2)

A three-neck flask equipped with Dimroth condenser was charged with 1,200 parts by weight of the polymer diol having a number average molecular weight of 2,500 and shown by the following formula 5, 360 parts by weight of diphenyl-methane 4,4'-diisocyanate and 60 parts by weight of ethylene glycol (molar ratio to the polymer diol: 2.0) and a solvent of 3,780 parts by weight of dimethylformamide. The mixture was reacted under an atmosphere of nitrogen at 85° C. for 8 hours to give a polyurethane solution. The polyurethane solution thus obtained had a solid concentration and a viscosity measured with a B-type viscometer at 30° C. of 30% by weight and 1,240 cps, respectively. The toluene solubility of the polyurethane was found to be 7% by weight.

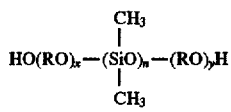

wherein R is an ethylene group and n, X and Y are 16, 14 and 14, respectively, in averages, and the content of Si in the polymer diol is 19.8% by weight.

Process for producing polydimethylsiloxane-modified polyurethane (b-3)

A three-neck flask equipped with Dimroth condenser was charged with 2,000 parts by weight of the polymer diol having a number average molecular weight of 2,000 and shown by the above formula 4 with the average of n being 23.5 and 250 parts by weight of diphenyl-methane-4,4'-diisocyanate and a solvent of 1,500 parts by weight of dimethylformamide. The mixture was reacted under an atmosphere of nitrogen at 85° C. for 8 hours, to give a polyurethane solution (that is, this polyurethane used no chain extender). The polyurethane solution thus obtained had a solid concentration and a viscosity measured with a B-type viscometer at 30° C. of 60% by weight and 3,200 cps, respectively. The toluene solubility of the polyurethane was found to be 98% by weight.

EXAMPLE 7

Example 1 was repeated except that 3 parts by weight of the above-described polydimethylsiloxane modified polyurethane (b-1) was used instead of 1.5 parts by weight of CRISVON ASSISTOR SD7® and 1.5 parts by weight of CRISVON ASSISTOR SD14®, to obtain a leather-like sheet. The leather-like sheet was then dyed with dyes of Vitanyl Brill Blue KBG 5.0 owf and Kayakalan Grey VL 0.2 owf and a pH adjusting agent of Kayaku Buffer AC 1.0 q/l in a bath ratio of 20:1 and at a dyeing temperature of 90 for 60 minutes. Then, the sheet was found to be dyed to a bright blue color and be a suede-tone leather-like sheet having a gentle, high-quality feeling resembling natural leather. The leather-like sheet was sewn into a blazer coat for women. The coat was compared with one prepared from the leather-like sheet obtained in Example 1 by a panel of 100 women, among which 86 answered that the coat using the leather-like sheet of Example 7 was closer to natural leather and had better high quality feeling.

EXAMPLE 8

Example 1 was repeated except that 3 parts by weight of the above-described polydimethylsiloxane modified polyurethane (b-2) was used instead of 1.5 parts by weight of CRISVON ASSISTOR SD7® and 1.5 parts by weight of CRISVON ASSISTOR SD14®, to obtain a leather-like sheet. The leather-like sheet was then dyed under the same dyeing conditions as used in Example 7, to give a leather-like sheet dyed in a markedly bright blue color. The leather-like sheet was sewn into a blazer coat for women. The coat was compared with one prepared from the leather-like sheet obtained in Example 1 by a panel of 100 women, among which 92 answered that the coat using the leather-like sheet of Example 8 was closer to natural leather and had better high quality feeling.

Comparative Example 10

Example 1 was repeated except that 3 parts by weight of the above-described polydimethylsiloxane modified polyurethane (b3) was used instead of 1.5 parts by weight of CRISVON ASSISTOR SD/and 1.5 parts by weight of CRISVON ASSISTOR SD14, to obtain a leather-like sheet. The leather-like sheet was then dyed under the same dyeing conditions as used in Example 7, to give a leather-like sheet dyed in a bright blue color. However, the leather-like sheet was harder than those obtained in Examples 7 and 8 and had no gentle hand or tactility. The sheet was sewn into a blazer coat for women. The coat was compared with one prepared from the leather-like sheet obtained in Example 1 by a panel of 100 women, among which 52 judged that there was almost no difference between the two coats and the rest, having diverse opinions, could not judge which was better.

Industrial Applicability

The leather-like sheets according to the present invention, using polyurethanes having excellent properties, such as mechanical characteristics and durability, as well as excellent processability, and being dyeable with acid dyes, are soft and of good hand and dyeable with what is known as acid dyes, such as acid dyes and metal complex dyes. The leather-like sheets, having excellent color development and durability, are useful for clothing, shoes, bags, furniture, car interior, sundries and like items.

What is claimed as new and desire to be secured by Letters Patent of the United States is:

1. A polyurethane composition comprising a mixture of a first and second polyurethane:
   wherein said first polyurethane (a) is obtained by reacting:
      an intermediate product diol (D) with both ends thereof consisting essentially of OH and obtained by reacting a tertiary amino group-containing diol (A), a polymer diol (B) having a number average molecular weight of 500 to 3,000 selected from the group consisting of polyesters, polycarbonates, polylactones and polyethers and an organic diisocyanate (C1), in such stoichiometric amounts as to make the molar ratio of NCO/OH 0.5 to 0.99,
      a diol chain extender (E),
      diphenylmethane-4,4'-diisocyanate (C2), and
      said second polyurethane (b) has a solubility in toluene of not more than 50% by weight and obtained by reacting a polymer diol having structural units from dimethylsiloxane and an organic diisocyanate (C3) and having a number average molecular weight of 1,000 to 10,000,
   the ratio of said second polyurethane (b) to said first polyurethane (a) being in a range of 0.5 to 50% by weight based on the first polyurethane (a).

2. A process for producing polyurethanes, which comprises combining
   a first polyurethane (a) obtained by reacting a tertiary amino group-containing diol (A), a polymer diol (B) having a number average molecular weight of 500 to 3,000 selected from the group consisting of polyesters, polycarbonates, polylactones and polyethers and an organic diisocyanate (C1), in such stoichiometric amounts as to make the molar ratio of NCO/OH 0.5 to 0.99, to obtain an intermediate product diol (D), and reacting the intermediate product diol (D), a diol chain extender (E), and diphenylmethane-4,4'-diisocyanate (C2),
   with a second polyurethane (b) having a solubility in toluene of not more than 50% by weight and obtained by reacting a polymer diol having structural units from dimethylsiloxane and an organic diisocyanate (C3) and having a number average molecular weight of 1,000 to 10,000.

the ratio of said second polyurethane (b) to said first polyurethane (a) being in a range of 0.5 to 50% by weight based on the first polyurethane (a).

3. A synthetic leather sheet comprising:

a fibrous base and a polyurethane composition comprising a mixture of a first and second polyurethane, wherein said first polyurethane is obtained by reacting:

an intermediate product diol (D) with both ends thereof consisting essentially of OH and obtained by reacting a tertiary amino group-containing diol (A), a polymer diol (B) having a number average molecular weight of 500 to 3,000 selected from the group consisting of polyesters, polycarbonates, polylactones and polyethers and an organic diisocyanate (C1), in such stoichiometric amounts as to make the molar ratio of NCO/OH 0.5 to 0.99, a diol chain extender (E), and diphenylmethane-4,4'-diisocyanate (C2) and a second polyurethane (b) having a solubility in toluene of not more than 50% by weight and obtained by reacting a polymer diol having structural units from dimethylsiloxane and a second organic diisocyanate (C3) and having a number average molecular weight of 1,000 to 10,000, the ratio of said second polyurethane (b) to said first polyurethane (a) being in a range of 0.5 to 50% by weight based on the first polyurethane (a).

4. The polyurethane according to claim 1, wherein said polymer diol (B) is a polyester obtained from an aliphatic dibasic acid having 4 to 8 methylene chain carbon atoms and an aliphatic diol having 4 to 9 main chain carbon atoms.

5. The polyurethane according to claim 1, wherein said polymer diol (B) is a polycarbonate obtained from an aliphatic diol having a 4 to 9 main chain carbon atoms.

6. The polyurethane according to claim 1, wherein said organic diisocyanate (C1) is at least one member selected from the group consisting of diphenylmethane-4,4'-diisocyanate, isophorone diisocyanate and 2,4-or 2,6-tolylene diisocyanate.

7. The process for producing polyurethanes according to claim 2, wherein said polymer diol (B) is a polyester obtained from an aliphatic dibasic acid having 4 to 8 carbon atoms and an aliphatic diol having 4 to 9 main chain carbon atoms.

8. The process for producing polyurethanes according to claim 2, wherein said polymer diol (B) is a polycarbonate obtained from an aliphatic diol having 4 to 9 main chain carbon atoms.

9. The process for producing polyurethanes according to claim 2, wherein said organic diisocyanate (C1) is at least one member selected from the group consisting of diphenylmethane-4,4'-diisocyanate, isophorone diisocyanate and 2,4-or 2,6-tolylene diisocyanate.

10. The synthetic leather sheet according to claim 3, wherein said polymer diol (B) is a polyester obtained from an aliphatic dibasic acid having 4 to 8 methylene chain carbon atoms and an aliphatic diol having 4 to 9 main chain carbon atoms.

11. The synthetic leather sheet according to claim 3, wherein said polymer diol (B) is a polycarbonate obtained from an aliphatic diol having a carbon chain length of 4 to 9.

12. The synthetic leather sheet according to claim 3, wherein said organic diisocyanate (C1) is at least one member selected from the group consisting of diphenylmethane-4,4'-diisocyanate, isophorone diisocyanate and 2,4-or 2,6-tolylene diisocyanate.

13. A process for producing suede tone synthetic leather sheets having a fibrous nap, which comprises impregnating a fiber entangled nonwoven fabric formed of ultrafine fiber generating fibers having a fineness of 2 to 15 deniers comprising a vinyl polymer with a solution of a polyurethane and wet coagulating the solution, to prepare a polyurethane-containing entangled nonwoven fabric, removing by extraction the vinyl polymer of the ultrafine fiber-generating fibers constituting the nonwoven fabric to convert the ultrafine generating fibers into ultrafine fibers of not more than 0.2 denier, and then treating the surface of the nonwoven fabric to form a napped surface and dyeing the nonwoven fabric;

wherein said polyurethane is a mixed polyurethane composition comprising a mixture of a first and second polyurethane, wherein said first polyurethane (a) is obtained by reacting:

an intermediate diol (D) with both ends thereof essentially being OH and obtained by reacting a tertiary amino group-containing diol (A), a polymer diol (B) having a number average molecular weight of 500 to 3,000 and selected from the group consisting of polyesters, polycarbonates, polylactones and polyethers, and an organic diisocyanate (C1), in such stoichiometric amounts as to make the molar ratio of NCO/OH 0.5 to 0.99, a diol chain extender (B), and diphenylmethane-4,4'-diisocyanate (C2), and said second polyurethane (b) has a solubility in toluene of not more than 50% by weight and is obtained by reacting a polymer diol having structural units from dimethylsiloxane and an organic diisocyanate (C3) and having a number average molecular weight of 1,000 to 10,000, the ratio of said second polyurethane (b) to said first polyurethane (a) being in a range of 0.5 to 50% by weight based on the first polyurethane (a).

* * * * *